June 27, 1950 — A. M. CASABONA — 2,512,611
DIRECTIONAL RADIO RECEIVER
Filed Oct. 1, 1948 — 2 Sheets-Sheet 1

INVENTOR
ANTHONY M. CASABONA
BY
ATTORNEY

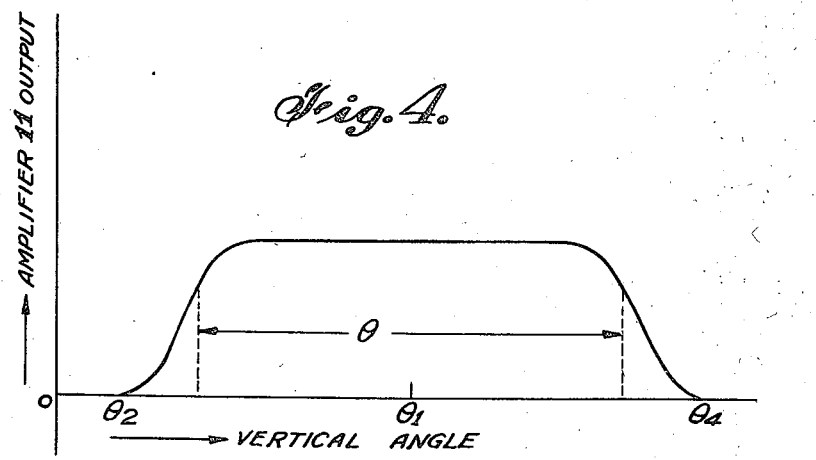
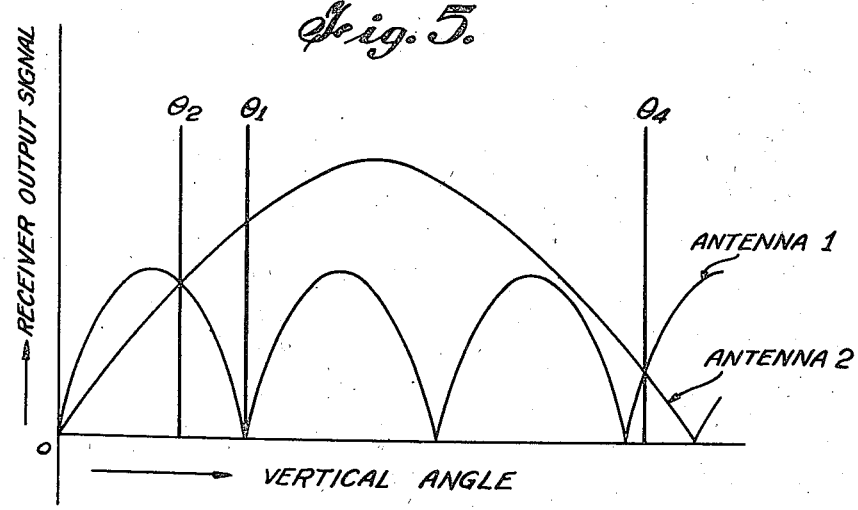

Patented June 27, 1950

2,512,611

UNITED STATES PATENT OFFICE 2,512,611

DIRECTIONAL RADIO RECEIVER

Anthony M. Casabona, Hawthorne, N. Y., assignor to International Standard Electric Corporation, New York, N. Y., a corporation of Delaware Application October 1, 1948, Serial No. 52,310

4 Claims. (Cl. 343—113)

My invention relates to directional radio receivers and is particularly directed to improvements in glide path landing equipment for aircraft.

In radar-type receivers for glide path control, it is often necessary to distinguish between pulse signals reflected from low flying aircraft and from fixed, relatively high ground obstacles such as trees, buildings, hills and the like. On the oscilloscope screen, the so-called ground clutter caused by the fixed obstacles will cause erroneous position readings.

The principal object of my invention is a directional receiver which will reliably distinguish between desired signals from aircraft close to the ground and signals from fixed obstacles on the ground.

A more specific object of my invention is a directional receiver having a vertical receiving pattern that will reject signals abruptly at low controllable vertical angles.

In accordance with my invention, two directional antennae having diverging lobe patterns are individually connected to demodulators having manual gain controls. The output signals are combined in mutual phase opposed relation, are rectified and amplified, the latter amplifier having automatic volume control. The signal thus obtained is applied to a signal indicating means such as an oscilloscope. The relative gains of the demodulators may be adjusted to control the vertical beam width as well as the lower limit of the beam. Low flying aircraft near ground obstacles may, with my invention, be reliably distinguished, yet high flying aircraft close to the receiver may be "seen" with equal clarity.

The above-mentioned and other features and objects of my invention and the manner of attaining them will become more apparent and the invention itself will be best understood, by reference to the following description of an embodiment of the invention taken in conjunction with the accompanying drawings, wherein:

Figs. 3, 4 and 5 are graphs showing the functional relation of vertical angle and important voltages of my receiver.

Figure 1:
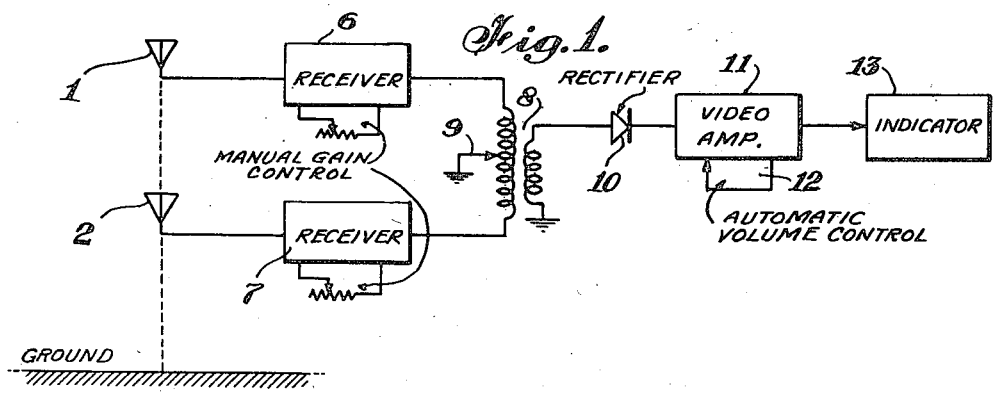
Fig. 1 is a circuit diagram of my novel receiver.
Figure 2:
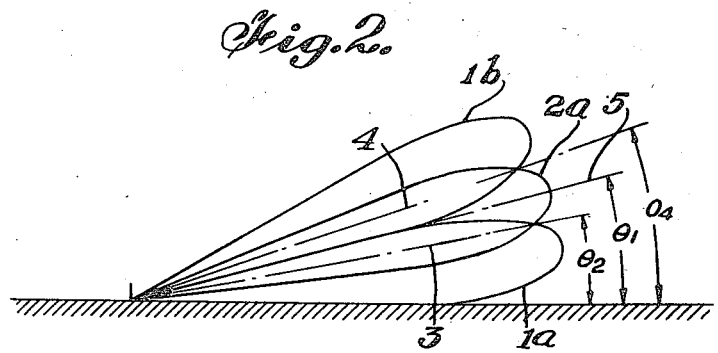
Fig. 2 is a polar diagram of antenna directivity.
Figure 3:
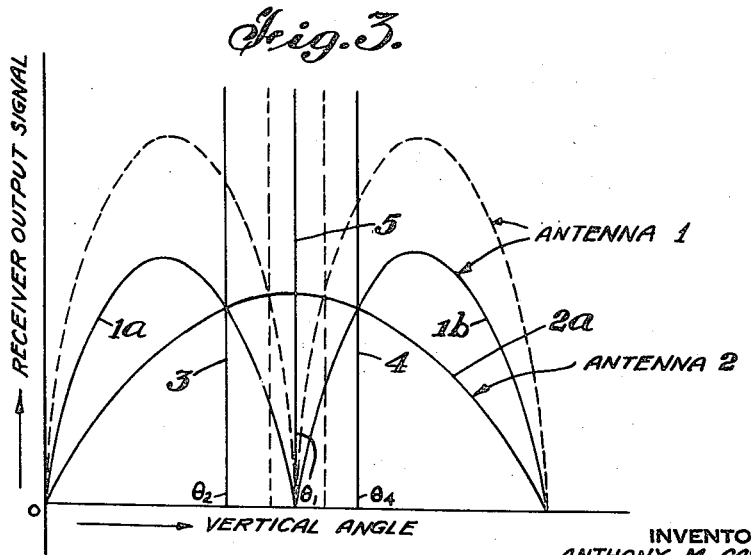

It is contemplated that the glide path control means to which my invention is directed comprises a transmitter for pulses of ultra high frequency of considerable power at or near aircraft runways, and that these pulses, reflected from approaching aircraft, are received on the ground so that the information as to elevation and bearing of the craft appearing on the screen of an oscilloscope may be employed for guiding the aircraft. In Fig. 1 is shown, partly in block diagram, the essential parts of the receiver according to my invention for such a system. The two antennae 1 and 2, shown diagrammatically, may be of the directional types such as loops which when disposed in horizontal planes, one above the other, have the directional patterns best shown by the polar diagram of Fig. 2. Alternatively, the antennae 1 and 2 may comprise end-to-end dipoles arrayed one above the other in a vertical line. By proper adjustment of the distance of the upper antenna 1 above ground a plurality of lobes $1a$ and $1b$ may be obtained. The lower antenna 2 may have a principal lobe $2a$. Signals received from any point along the equipotential lines 3 or 4, at vertical angle $\theta_2$ or $\theta_4$ above ground produce voltages of equal magnitude on the two antennae, whereas signals received from points on either side of line 3 or 4 produces unbalanced antenna voltages. Line 5 is usually used as the glide path for landing aircraft. The functional relation of the antenna voltages and vertical angles for one specific set of antenna parameters are shown by rectilinear ordinates in Fig. 3.

The receivers 6 and 7, connected to the antennae 1 and 2, respectively, are similar in all respects and may comprise the usual heterodyning, detecting or demodulating, and amplifying stages. The receivers are characterized, however, by the absence of automatic volume control, or limiter or clipper tubes, so that the amplitude of the signal pulses reproduced in the output circuits represent closely the amplitude of the signal pulses received at the antennae. That is, the output signals of the receivers are substantially linear functions of the input signals over a wide range of amplitude.

The receiver outputs are then combined in phase opposition so that one output signal tends to buck or neutralize the other. One convenient and inexpensive means is a simple transformer 8 with the center-tap 9 on the primary. Hence, when the receiver pulses are equal in amplitude no voltage is induced in the secondary.

The secondary winding is connected to a half-wave rectifier 10 which may be of the dry-plate or vacuum or gas filled types. In the particular circuits shown, the rectifier 10 is so polarized as to pass only signals received from receiver 7. The rectified signals are then amplified in the amplifier 11, which may be of any of the conventional broad-band types commonly used for video amplification. Amplifier 11, however, includes automatic volume control circuits, indicated diagrammatically at 12, and are adjusted to maintain the output at a constant level over a wide range of input signal voltages. The amplifier output may be applied to an indicator 13, consisting of one pair of deflection plates or one deflection coil of a cathode ray oscilloscope, or other indicating means.

Referring again to Fig. 3, at the angle $\theta_1$, the antenna 1 signal is zero so that the signal from antenna 2 will appear unchanged at the output of the video amplifier. As the vertical angle drops toward $\theta_2$ some antenna 1 signal is obtained which partially bucks the antenna 2 signal in the balanced transformer. Less input will be delivered to the video amplifier but the output signal will be restored to the value obtained at $\theta_1$ by the automatic volume control. Finally, at angle $\theta_2$, equal signals are obtained from antennae 1 and 2 so that signal voltages at the transformer 8 are equal and because they are of opposite polarity, the input to the video amplifier 11 is zero. Hence, at angles lower than $\theta_2$ signal from antenna 1 will predominate but because of polarity will not be passed by the rectifier 10. The output will remain zero for all angles less than $\theta_2$, and by adjusting angle $\theta_2$ to just clear ground obstacles, the so-called ground clutter is effectively eliminated from the oscilloscope screen, or other indicating device.

The effective over-all vertical pattern which results is shown in Fig. 4. The exact shape of this pattern depends, to a certain extent on the automatic volume control of the video amplifier, and the absolute vertical beam width can be said to extend from $\theta_2$ to $\theta_4$. However, as measured to half power points, the beam width is that designated as $\theta$ in Fig. 4.

This beam width or aperture is easily controlled by varying the relative gains of the receivers. For instance, if the gain of the receiver 6, connected to antenna 1, was increased the pattern shown dotted in Fig. 3 would result. Under these conditions, the intersections of the antennae lobes shift inward and the beam width is narrowed and extends from $\theta_3$ to $\theta_5$. Conversely, if the gain of amplifier 7 was increased, the intersections would spread, and angle $\theta_2$ would lessen or approach the ground.

If it is desired that high flying aircraft close to the airport be visible, the vertical pattern must extend to a large angle in the upward direction without losing its sharpness at the lower limit. This can be done by adjusting the relative heights of the upper and lower antennas. If the lower antenna is lowered, the patterns shown in Fig. 5 result. Here the upper limit $\theta_4$ has been moved up considerably while the lower limit $\theta_2$ has remained close to the glide angle $\theta_1$. Hence, $\theta_2$ can again be adjusted, by varying the gains of the receivers, so that it just skims all ground clutter while all aircraft below the steep limit, $\theta_4$, may be seen.

While I have described above the principles of my invention in connection with specific apparatus, it is to be clearly understood that this description is made only by way of example and not as a limitation to the scope of my invention.

I claim:

1. A first and a second antenna one generally above the other and of such distances above the ground as to have field strength patterns including slightly upwardly inclined diverging lobes; a separate radio receiver connected to each antenna, each receiver having manual gain control means and being substantially linearly responsive to a wide range of input signal levels; means to combine the output signals of, and derive the arithmetic differences in the output signals of, the receivers; means to select difference-signal voltages of a given polarity; and means to indicate the value of said voltages in terms of angular position of the source of the signals with respect to said antennae, the mentioned combining means and indicating means being serially connected to the outputs of said receivers.

2. The method of radio direction indicating comprising establishing a first directional antenna pattern with a principal lobe, establishing a second directional antenna pattern with a plurality of lobes, juxtaposing said principal lobe of said first pattern over the plural lobes of said second pattern to establish known equipotential lines, separately amplifying the signals of said antennae, changing the relative amplification of the antennae signals to shift the intersection of lobe lines and hence to change the apparent position of the equipotential lines.

3. The method of glide path control comprising adjusting the vertical height above ground of two antennae to establish overlapping pattern lobes at different vertical angles, separately amplifying the signals received by each antenna, changing the amplification of one antenna signal with respect to the other to change the vertical angles of equipotential lines, and comparing and indicating the amplified signals.

4. The method of glide path control comprising adjusting the vertical height above ground of two antennae to establish overlapping pattern lobes at different vertical angles, separately amplifying the signals received by each antenna, selectively changing the amplification of one antenna signal with respect to the other to change the vertical angles of equipotential lines, and deriving voltages proportional to the difference between the antennae signal voltages and visually recording the derived voltages.

ANTHONY M. CASABONA.

REFERENCES CITED

The following references are of record in the file of this patent:

UNITED STATES PATENTS

| Number | Name | Date |
| --- | --- | --- |
| 2,061,737 | Offenhauser | Nov. 24, 1936 |
| 2,213,859 | Hahnemann | Sept. 3, 1940 |
| 2,406,875 | Watts | Sept. 3, 1946 |
| 2,456,666 | Agate et al. | Dec. 21, 1948 |